03-07-72 XR 3,647,946

United States Patent [15] 3,647,946

Enloe [45] Mar. 7, 1972

[54] SINGLE-TUBE COLOR TV CAMERA USING 120° PHASE SEPARATION

[72] Inventor: Louis H. Enloe, Colts Neck, N.J.

[73] Assignee: Bell Telephone Laboratories, Incorporated, Murray Hill, N.J.

[22] Filed: Dec. 10, 1969

[21] Appl. No.: 883,899

[52] U.S. Cl. ....................178/5.4 ST, 350/171
[51] Int. Cl. ....................H04n 9/06
[58] Field of Search ....................178/5.4 ST, 5.4 R; 350/162, 350/169, 171, 172

[56] References Cited

UNITED STATES PATENTS

| | | | |
|---|---|---|---|
| 2,734,938 | 2/1956 | Goodale | 178/5.4 |
| 2,769,855 | 11/1956 | Boothroyd et al. | 178/5.4 |
| 3,534,159 | 10/1970 | Eilenberger | 178/5.4 |
| 3,566,018 | 2/1971 | Macovski | 178/5.4 |

OTHER PUBLICATIONS

Hayashi Kazuo et al., " Recent Developments of Color Television Cameras at NHK," NHK Laboratories Note Ser No. 113 Sept. 1967

*Primary Examiner*—Richard Murray
*Assistant Examiner*—P. M. Pecori
*Attorney*—R. J. Guenther and E. W. Adams, Jr.

[57] ABSTRACT

An optical system spatially modulates three individual primary-color images onto a common spatial carrier frequency with 120° phase separation. Electron beam scanning of a single tube converts the spatially modulated image to an electrical output signal composed of an average value and a chrominance signal consisting of three modulated waves at a single electrical color carrier frequency separated in phase by 120°. Since the scan velocity varies, the frequency of the electrical color carrier is modulated by the velocity. A signal having the same modulation is used as a reference for phase demodulation of the chrominance signal to produce three individual components. The average value of the output signal, which represents the monochrome, is combined with each of the individual components to form three independent signals, each representative of one of the primary images. The phase demodulation technique requires substantially lower spatial resolution than time sequential or frequency separation schemes, and the specific 120° spatial phase separation of the image components insures against hue shift due to variations in the tube's aperture response.

3 Claims, 6 Drawing Figures

Patented March 7 1972 3,647,946

3 Sheets-Sheet 1

INVENTOR
L. H. ENLOE
BY David L Hurewitz
ATTORNEY

SINGLE-TUBE COLOR TV CAMERA USING 120° PHASE SEPARATION

BACKGROUND OF THE INVENTION

This invention relates to color television signal generation and, more particularly, to a novel color television camera system using a single-image pickup tube.

Broadcast television has evolved from black and white to color and it is anticipated that nonbroadcast or closed-circuit television systems, such as the viewing adjunct to the telephone commonly known as Picturephone service, will provide color images in the future. Before feasible closed-circuit color television can be provided, a simple reliable and inexpensive color camera system must be found, especially if it is to be suitable for home use. As used herein, a camera system, or simply a camera, includes all that is necessary to produce an image of the subject and convert the image to an electrical output for application to a transmission medium. Essentially, a color camera comprises an optical system to produce an image on a target, a pickup scanning system to convert the image to an electronic representation and a demodulation system which operates on the representation to produce an output containing three independent variables which, as is well known, are required to provide complete color information.

A single pickup tube can provide the three independent variables, but as the tube is sensitive only to the intensity of light the color information must be obtained as a function of position on the target. A single-tube color camera is disclosed in U.S. Pat. No. 2,733,291 issued Jan. 31, 1956 to R. D. Kell. However, commercial use of this system has been severely limited because of the high camera tube resolution required. The Kell-type camera utilizes two striped color filters between the subject and the target. One of these spatially modulates the red primary image at a frequency of a few hundred cycles per picture width as defined by the spacing of the stripes. As used herein, spatial modulation of an image means forming the image in discrete spatially separated regions and the frequency of modulation is the frequency of repetition of the regions. The blue and green primary images pass through this filter unaffected and the red output signal is obtained by passing the amplitude-modulated signal through an appropriate band-pass filter and envelope detector. The other striped color filter performs the same function for the blue color image with its carrier frequency being higher than that of the red signal. The low-frequency portion of the video contains a linear combination of the red, green and blue signals and appropriate matrixing with the other two outputs yields the green signal.

The problems of such a system include noise in the higher frequency channel and color or hue shading. The major portion of these defects is attributable to limitations in the blue channel. The camera tube response at the blue carrier frequency is attenuated considerably relative to its low-frequency value, resulting in some excess noise. Moreover, because of variations in focusing the electron beam at the extremities of the picture, this attenuation is a function of the position on the target. The resultant hue shift or color shading as a function of position can be reduced to acceptable levels by brute force techniques such as shading controls and high-quality camera tubes, but these make the systems unattractive due to high cost and maintenance problems.

The Kell system provides multicolored vertical stripes across the target and utilizes a frequency separation of the three primary colors. The blue is modulated on a carrier of high frequency, red is modulated on an intermediate carrier, and green is part of a linear combination of all colors at a low frequency.

An alternative to frequency separation is a time sequential sampling technique. U.S. Pat. No. 2,827,512 issued Mar. 18, 1958 to R. J. Stahl et al. describes a single-tube color camera system having recurring vertical stripes of periodically red, green and blue images. These primary images are optically produced across the target and time sampling is utilized to distinguish the images. This time coding has the inherent disadvantage of requiring excessively high resolution from the system, because the scanning beam must be able to resolve each color stripe from the others and hence the stripes must be substantially wider than the scanning beam. In addition, the stripes must be separated from one another so that overlapping of colors does not result. For these reasons only a limited number of stripes is possible across the target and this limits the resolution of the picture.

SUMMARY OF THE INVENTION

In accordance with the present invention optical and electronic apparatus are combined to produce a single-tube color camera which overcomes the inadequacies of both the frequency separation and time sequential sampling techniques. A composite image of the subject consisting of three color images superimposed and registered is focused optically on a target of a conventional pickup tube. The images are in the form of 120° spatially separated stripes, each of which can be narrower than the width of the scanning beam. The output signal of the tube contains a low-frequency monochrome component and a high-frequency chrominance component which, due to the 120° spatial separation of the images, consists of three 120° phase-separated signals. Phase demodulation, using as a reference phase a signal from an auxiliary grating whose image is superimposed with the composite subject image on the target, separates the three high-frequency signals. These are combined with the monochrome signal to produce three appropriate independent outputs.

As phase demodulation is used, a unique technique for providing the phase reference is required. However, phase demodulation, in distinction to the conventional time sequential sampling, permits narrower and overlapping stripes so that more stripes can be placed across the target. This produces a substantially improved resolution without the need for costly pickup tubes having high beam resolution.

DETAILED DESCRIPTION

The Achilles' heel of most single-tube color cameras is the aperture response of the camera tube. It is typically pure real (that is, without imaginary components) and hence introduces no phase distortion, but the amplitude response is sufficiently limited in bandwidth that it is difficult to equalize and maintain a flat transmission characteristic over the required bandwidth, especially in view of the fact that the aperture response varies as a function of scanning beam position due to defocusing problems. In the Kell system this variation in aperture response produces corresponding variations in the amplitude of the blue carrier and results in hue variations.

The improved camera disclosed herein circumvents this problem. Only one carrier frequency and hence a minimum possible bandwidth is used. Further, any change in the magnitude of the color carrier, caused by beam defocusing or other spatially dependent factors, does not result in a hue shift. The luminance and saturation will be affected, but it is well known in the color art that if distortion must exist it should be distortion of saturation and/or luminance, but not hue.

Figure 1:
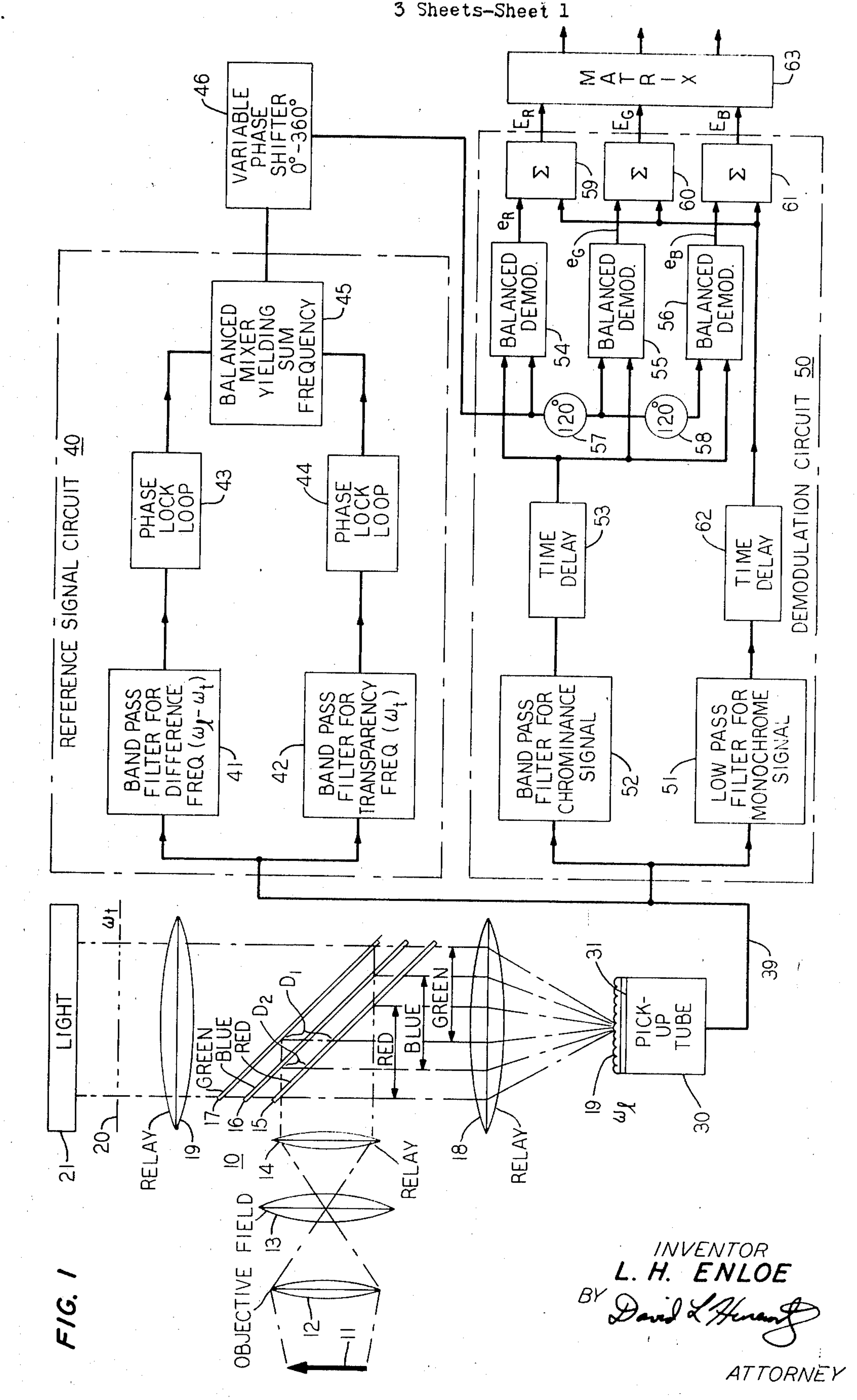
FIG. 1 is a block diagram of a single-tube color camera in accordance with the present invention.

A block diagram of the color camera system in accordance with the present invention is shown in FIG. 1. The camera consists of optical system 10, single monochrome pickup tube 30, reference signal circuit 40, and demodulation circuit 50. Each of the systems comprising the camera will be discussed below in detail, but essentially optical system 10 provides spatial phase separation of primary color images; reference signal circuit 40 provides a signal which is modulated by the scan velocity just as is the image output of the tube 30; and demodulation circuit 50 utilizes phase differences among components of the image output from tube 30 and the reference signal from circuit 40 to convert the image output to three independent variables, such as red, green and blue designated $E_R(t)$, $E_G(t)$, and $E_B(t)$, respectively.

Optical System

Figure 2:
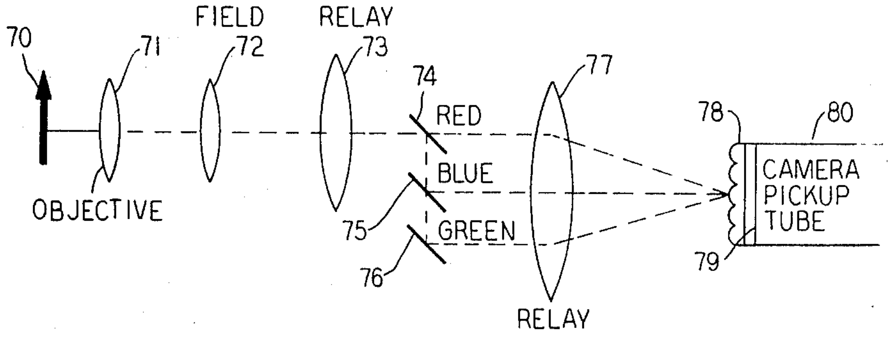
FIG. 2 PRIOR ART
FIG. 2 illustrates an optical system known in the prior art.

A prior art optical system is described in "Recent Developments in Color TV Cameras in Japan" by K. Hayashi in the Proceedings of the International Electronics Conference, Sept. 1967, Paper No. 67013, Session No. 1, and this system, which was designed for a time sequential two-tube color camera, is shown in FIG. 2. Light from object 70 passes through objective lens 71 and is imaged in the plane of field lens 72. The light then passes through relay lens 73 and emerges as a parallel beam which impinges on dichroic mirrors 74, 75 and 76 appropriately oriented to form three separate parallel primary beams of red, blue and green as illustrated. These beams are reimaged by lens 77 on the surface of lenticular lens plate 78 which is focused on target 79 of pickup tube 80.

Figure 2A:
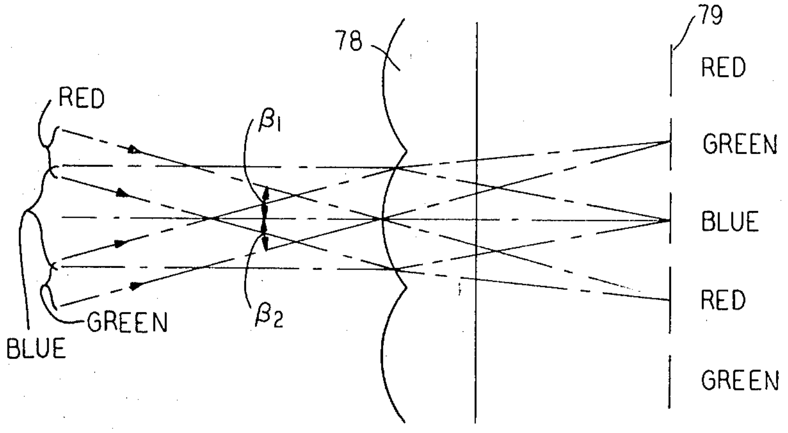
FIG. 2A is a diagram of the optical properties of a lenticular lens plate as used in the optical system of FIG. 2.

The optical action of the cylindrical lenticular lens plate 78 is illustrated in FIG. 2A. It is well known and described in detail in "The Optics of the Lenticular Color-Film Process" by R. Kingslake in the Journal of the SMPTE, Vol. 67, Jan. 1958, at pages 8–13, that a lenticular plate such as 78 will cause stripes to form on camera target 79 if target 79 is placed in the back focal plane of plate 78. The relative phase shifts of the stripes of different primary colors are controlled by the angles of arrival of the rays from dichroic mirrors 74–76 via relay lens 77 as well as the curvature of the lenslets. Essentially, the lenticular plate focuses the light on its back focal plane at discrete locations, the vertical separations of which are a function of the relative angles of incidence of the waves. As illustrated in FIG. 2A, the red image arriving at a lenticular plate at an angle $\beta_1$, is focused at a red point in each set. The blue light arriving at a zero angle is focused at a blue point in each set and the green arriving at an angle $\beta_2$ is focused at a green point in each set.

This optical system is theoretically 100 percent efficient; that is, all usable light is transferred to the camera target. However, it has the disadvantage of requiring a large diameter (high speed) of the last relay lens 77. Nevertheless, such an optical system could be used in the present invention if one were ready to accept this disadvantage.

Figure 4:
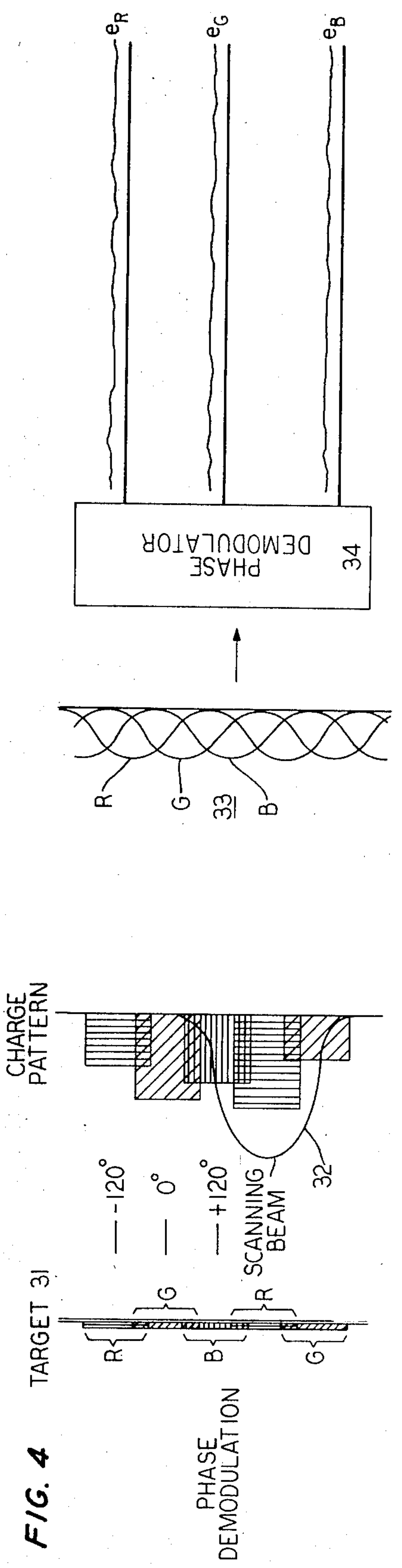
FIG. 4 illustrates a top view of the pickup tube target and corresponding signal diagrams of a phase demodulation camera in accordance with the invention.

In the present invention the function of optical system 10 in FIG. 1 is to form on target 31 of pickup tube 30 an image which consists of the three primary images superimposed and registered. Each primary image is spatially modulated in a horizontal direction across the face of target 31 at a repetition frequency selected for the required picture resolution. A frequency of approximately 150 cycles per picture width, that is 150 tricolor sets of stripes, has been found appropriate. A top view of a segment of target 31 is shown in FIG. 4 where each set of stripes is indicated as including a red (R), blue (B) and green (G) bar. Each bar therefore represents a vertical stripe of a primary color image on target 31.

The phase angles of the three spatial carriers are illustrated as being 120° apart, that is, the three stripes recur at equal intervals across the face of the target. This 120° spatial relationship is not absolutely necessary and if a different relationship is utilized, the only change necessary is an appropriate modification of demodulation circuit 50, and in fact, any nonzero spatial phase relationship among the primary images is possible by utilizing an appropriate matrixing scheme. However, the 120° relationship is preferred as it is the relationship which, as will be discussed below, results in the composite image output signal having an amplitude which is independent of hue. For purposes of illustration, assume angles of −120°, 0° and 120° for the red, green and blue, respectively. Such a spatial modulation of the three images can be accomplished efficiently.

Optical system 10 (FIG. 1) proposed for the present invention modifies the Japanese system of FIG. 2 in order to eliminate the disadvantage of the large diameter of the last relay lens 77. In addition, a reference grating necessary for the demodulation process has been added. Object 11 is focused by objective lens 12 on the plane of field lens 13 used to conserve light. Relay lens 14 passes the image as a beam of nearly parallel incident rays to dichroic mirrors 15, 16 and 17 which are exclusively reflective to red, blue, and green, respectively. Mirrors 15–17 are aligned parallel to one another at 45° angles to the nearly parallel rays and hence each radiates an individual primary color image orthogonal to the incident rays. These rays are focused by relay lens 18 onto lenticular plate 19 of spatial frequency $\omega_l$ lying on tube 30 and positioned so that target 31 lies in the back focal plane of lenticular plate 19. The lines from lens 18 to plate 19 illustrate light rays impinging upon a single lenslet, and equivalent rays exist for every other lenslet.

In preferred optical system 10, the primary color images red, blue and green, respectively, are formed into regions, the red region being shown on the extreme left as it is incident to relay lens 18, the blue region in the middle, and the green region on the right. This automatically creates overlapping of the color stripes on target 30 and hence would make time division demodulation impossible. However, as indicated above, this overlapping does eliminate the necessity of a very large diameter for a given focal length of lens 18.

The fact that the objective lengths of the green and blue images differ from the red by lengths $2D_1$ and $2D_2$, respectively, will cause the different primary images to be focused in different planes. It is shown, however, in the Kingslake article mentioned above, that though the cone angles of the image points of the three different colors will differ, they will, nevertheless, cross the back focal plane of lenticular lens 19 at the same points. This results in the same size and the same area for each color in this focal plane and hence there will be no color fringing. As indicated in Kingslake, this is true only if mirrors 15–17 are, as specified above, at 45° angles to the incident beam.

Phase Reference Signal

Figure 3:
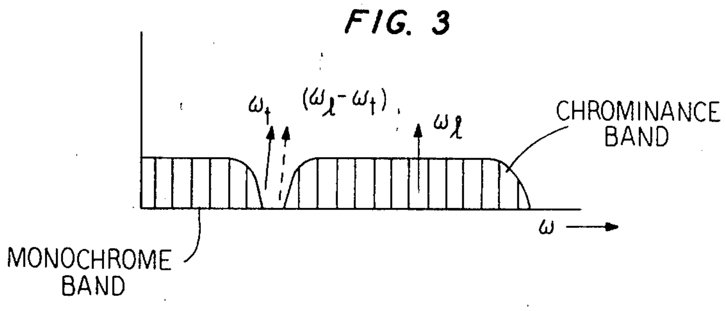
FIG. 3 is a frequency distribution diagram of a camera operating in accordance with the invention.

While the specific optical embodiment of FIG. 1 is suggested, alternative systems are, of course, possible, but the system described above is also suited to providing a phase-reference optical signal, which is necessary since the proposed phase-reference demodulation requires that the image output of tube 30 be phase-demodulated with respect to a reference carrier or index signal. In the NTSC system, the frequency of the chrominance subcarrier is extremely stable. Thus, conventionally the insertion of a sine wave burst in the horizontal blanking interval of the transmitted signal is used to synchronize the phase-locked oscillator used to provide the reference carrier wave. However, in the present camera, phasing is more difficult in that the color carrier is phase-modulated by variations in the scanning velocity of the electron beam of tube 30. The reference carrier must therefore track the beam in order to prevent color distortion. Accordingly, the image of an auxiliary transparency is focused onto lenticular lens 19 to provide a reference signal which is modulated by the velocity of the beam. Transparent grating 20, the density of which varies in a periodic fashion, such as sinusoidally, in the horizontal scanning direction X, is oriented so that light from auxiliary source 21 passes through grating 20 and impinges upon lens 19. The image of this transparency is optically modulated by lenticular lens 19, just as are the red, green and blue images, to produce the spatial difference frequency component $\cos[(\omega_l-\omega_t)X+(\alpha_l-\alpha_t)]$ and the original transparency component $\cos[\omega_t X+\alpha_t]$. The sum frequency is beyond the range of interest, and the component at the lenticular lens frequency $\cos\omega_l$ is unusable. Here, $\omega_t$, $\alpha_t$ and $\omega_l$, $\alpha_l$ are the spatial radian frequency and phase of the transparency 20 and lenticular lens 19, respectively. These components are converted into electrical signals by the scanning process of tube 30 and applied to reference signal circuit 40. Band-pass filters 41 and 42 pass only the difference frequency $\omega_l-\omega_t$ and the transparency frequency $\omega_t$, respectively, while excluding all other signals, such as the image components. The two passed signals are cleaned up by phase-lock loops 43 and 44, respectively, which may also be narrow-band filters. The signals are heterodyned together by balance mixer 45 to produce a signal at the sum frequency which is used as the desired phase-reference signal. It is noted that the frequency and phase of grating 20 are relatively unimportant since they cancel out. However, frequency $\omega_t$ should be high enough so that conceptually it and the difference frequency fall above the low-frequency monochrome band and yet below the chrominance band. The relationships between these frequencies can be seen in FIG. 3.

An alternative reference signal scheme for a system using 120° phase separation could simply utilize the output from the camera tube at the third harmonic of the lenticular lens frequency. Only a conventional divide by three circuit would be required to produce the reference signal from this third harmonic. "Run-in" stripes to eliminate the phase ambiguity and a pickup tube responsive to the third harmonic would, of course, be required for such a scheme.

Pickup and Phase Demodulation

Camera pickup tube 30 is a conventional black and white tube, such as a vidicon or plumbicon, which responds to the intensity of the light on target 31. It has no ability to determine the color of the impinging light, but detects only the intensity at successive points on the target. The camera output is delivered by cable 39 to reference signal circuit 40 and to demodulation circuit 50. The output contains the phase-reference signal discussed above as well as an image signal which consists of a low-frequency monochrome component and a high-frequency component centered about a carrier frequency where the high-frequency component contains the chrominance information. The image signal may be represented as $$e(t)=C\{[R(t)+G(t+B(t)]+[R(t\cos(\omega_L t-2\pi/3)+G(t)\cos\omega_l t+B(t)\cos(\omega_l t+2\pi/3)]\}, \qquad (1)$$

where $C$ is a proportionality constant and $R(t)$, $G(t)$ and $B(t)$ are signals proportional to the intensities of the red, green and blue images, respectively. The first term is a low-frequency monochrome term, and the second term is a high-frequency chrominance term, in which $R(t)$, $G(t)$, and $B(t)$ are modulated onto electrical carriers of the same frequency with their phases separated by 120°. Phase-reference demodulation essentially breaks the vector sum into three phase-separated components. These three components are not independent but contain only two independent variables. However, the monochrome component is a third independent variable and the combination of the four components provides recovery of three independent signals representing primary color images such as red, green and blue.

A monochrome signal, $M(t)$ defined as $(1/3)[R(t)+G(t)+B(t)]$ is recovered in circuit 50 by low-pass filter 51, and the high-frequency chrominance component is passed by band-pass filter 52 and delayed by delay circuit 53. A reference signal from circuit 40 in phase with the red, green and blue carriers, respectively, is multiplied with the chrominance signal by balanced demodulators 54, 55 and 56, respectively.

The signal from reference signal circuit 40 may be represented as $2\cos(\omega_l t+\phi)$ where the phase angle $\phi$ is initially adjusted by phase shifter 46 to assure that the phase of the signal applied to demodulator 54 is the same as the color carrier to be demodulated in that channel. Having assumed that the relative phase of the green carrier is zero, $\phi+2\pi/3$ for red, and hence $e_R(t)$, the output of demodulator 54, may be represented as $$e_R(t)=(2/3)R(t)-(1/3)[G(t)+B(t)], \qquad (2)$$

where the high-frequency terms centered about $2\omega_l$ are suppressed by appropriate filters in the output circuit of balanced demodulator 54. The phase of the reference signal from circuit 40 is successively advanced by 120° phase shifters 57 and 58 and hence the reference signal used to multiply the remaining two portions of the chrominance signal in demodulators 55 and 56 is advanced by 120° and 240°, respectively, from the reference signal used to produce the red component $e_R(t)$. The outputs of demodulators 58 and 56 are therefore respectively $$e_G(t)=(2/3)G(t)-(1/3)[B(t)+R(t)] \qquad (3)$$

and $$e_B(t)=(2/3)B(t)-(1/3)[G(t)+R(t)]. \qquad (4)$$

Time delay circuit 62 delays the monochrome signal from filter 51 just as the chrominance signal is delayed by circuit 53. These delays simply correspond to the delay provided by loops 43 and 44 and keep the image and reference signals in synchronization. The delayed monochrome signal $M(t)$ is combined with the signals $e_R(t)$, $e_G(t)$ and $e_B(t)$ from demodulators 54, 55 and 56 by individual summers 59, 60 and 61, respectively, to recover the detected primary signals $E_R(t)$, $E_G(t)$ and $E_B(t)$, respectively. These signals may be coded in any manner desirable before being applied to an appropriate transmission means. Additional matrixing is in all likelihood desirable before transmission and this may, of course, be provided by conventional linear matrix 63. Alternatively, summers 59, 60 and 61 could be replaced by appropriate matrixing circuitry to give any suitable output of three independent variables.

One of the primary advantages of this system is that any change in the magnitude of the color carrier, caused by beam defocusing or other spatially dependent factors, does not produce a hue shift. Attenuating the color carriers is equivalent to introducing identical amplifiers of gain K into the demodulator outputs $e_R(t)$, $e_G(t)$ and $e_B(t)$, where $K=1$ represents zero attenuation. The recovered primary voltages are respectively:

$$\begin{aligned} E_R(t)&=M(t)+Ke_R(t)=KR(t)+M(t)[1-K]\\ E_G(t)&=M(t)+Ke_G(t)=KG(t)+M(t)[1-K]\\ E_B(t)&=M(t)+Ke_B(t)=KB(t)+M(t)[1-K] \end{aligned} \qquad (5)$$

The voltages $E_R(t)$, $E_G(t)$ and $E_B(t)$ can be thought of as masses in the usual mass-centroid analogy described in Chapter 6 of *The Reproduction of Color* by R. W. G. Hunt, John Wiley & Sons, Inc. 1967. Neglecting the second term in the right side of each of equations 5, a triangle having masses $KR(t)$, $KG(t)$ and $KB(t)$ at its vertices would have the same centroid as an identical triangle having masses $R(t)$, $G(t)$ and $B(t)$. Hence, $K$ varies, the first term does not affect either saturation or hue, but only luminance.

The second terms in the right sides of equations 5 are equal. Adding equal masses at the vertices of a triangle causes the centroid to move from its previous location along a straight line towards the position that the centroid would occupy if only these equal masses were present, which is to say, the color moves from the correct value towards reference white as $K$ varies. Hence, the total effect is that both luminance and saturation change, as $K$ varies, but hue does not change. Skin tones might lighten (or become more ruddy for $K>1$) but they won't change to green, etc.

Figure 5:
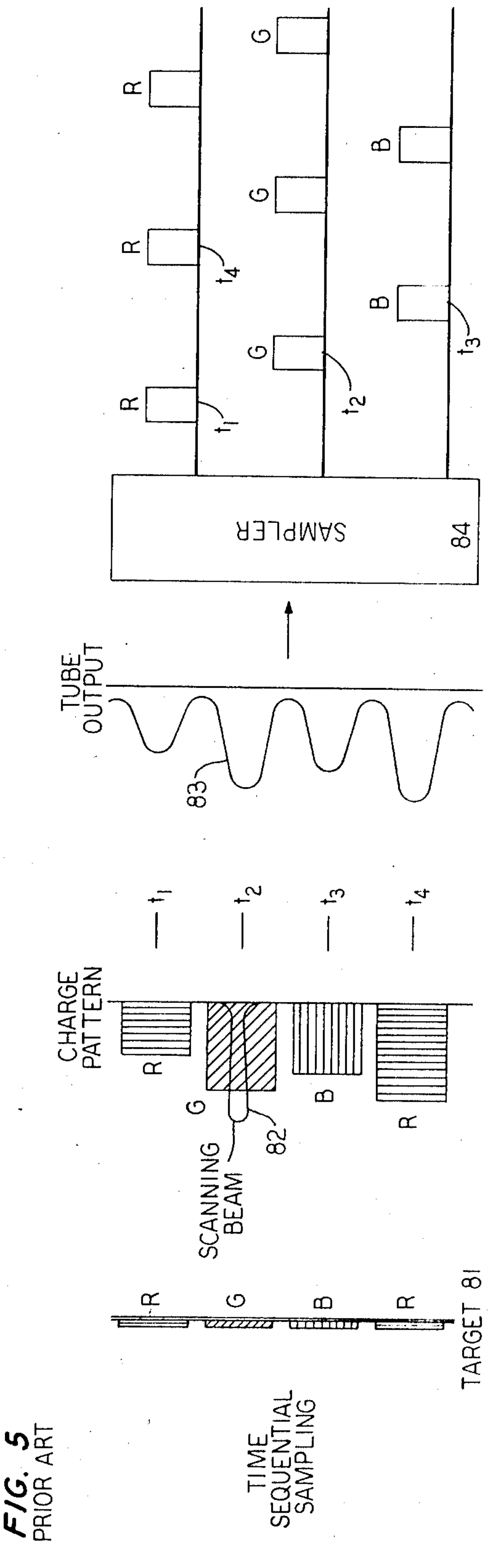
FIG. 5 PRIOR ART
FIG. 5 illustrates a top view of the pickup tube target and corresponding signal diagrams of a prior art time sequential sampling camera.

Signal diagrams of a phase demodulation camera system are illustrated in FIG. 4 in contrast to those of a time sequential sampling system illustrated in FIG. 5. The two techniques are similar only in that both utilize a conventional monochrome pickup tube. Optical systems such as the dichroic mirror, lenticular lens combination described above produce the primary color images in recurring vertical stripes. These stripes are represented in FIGS. 4 and 5 in top views of segments of targets 31 and 81 by bars designated R, G and B for red, green and blue, respectively. A primary distinction is that the time sequential stripes are, of necessity, spatially distinct whereas the phase demodulation stripes may overlap as shown.

The charge patterns corresponding in position to the vertical stripes are illustrated as having random intensities which are, of course, determined by the subject. The currents of the beam which scan targets 31 and 81 are designated 32 and 82, respectively. In the sampling case, beam 82 must be narrow relative to the width of the stripes and thus a high resolution of the tube is required to avoid color crosstalk. Tube output 83 is thus essentially representative of a single color only at a position and time central to a specific stripe. However, in between the central times such as $t_1$, $t_2$, etc., the output is a result of a combination or crosstalk of colors. Sampler 84, however, utilizes only these representative times and disgards the rest of the output. The output is thus a time sequential series of sample pulses representative of the three primary images R, G and B.

In the phase demodulation case, beam 32 is not required to have high resolution and may detect a few stripes simultaneously as described above. The image output will contain a low-frequency portion in addition to a high-frequency portion consisting of three components which are phase-separated by an amount identical to the spatial separation of the stripes. These components are represented as 120° phase-separated modulated sinusoids 33 designated individually R, G and B. Phase demodulator 34, a part of demodulation circuit 50, unlike sampler 84, utilizes the continuous output to produce the three continuous high-frequency signals $e_R$, $e_G$ and $e_B$, which together contain only chrominance information. The low-frequency monochrome signal which must be combined with $e_R$, $e_G$ and $e_B$ to produce the three individual outputs is also contained in the tube output. For simplicity, this monochrome component, as well as the grating component at $\omega_t$ and the difference component at $\omega_l - \omega_t$, is not included in waveform 33, but all of the superposed components can be seen in the frequency distribution of FIG. 3.

Time sequential sampling is thus limited to optics producing spatial exclusivity of the color stripes and to high-resolution beams whereas phase demodulation operates with overlap of stripes and a low-resolution beam. The overlapping stripes permit a greater number of them to be used and hence higher picture quality for the phase demodulation technique. In addition, for the same size stripes, phase demodulation can utilize a lower resolution and less expensive tube or alternatively a larger number of smaller stripes can be used with the same resolution tube.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

I claim:

1. A color television camera comprising:

optical means for focusing on a plane a composite image of a subject consisting of three primary color images superimposed and registered such that each of said primary images is spatially modulated onto a carrier at a common frequency, said carriers being mutually separated by a phase of 120 spatial degrees, means for passing light through a transparent periodic grating having a frequency below said common frequency to form a light pattern, means for superposing said light pattern on said composite image, a single electron beam pickup tube having a target in said plane and electron beam means for scanning said target to produce a signal consisting of a low-frequency component proportional to the monochrome of said composite image, a high-frequency component proportional to the chrominance of said composite image, said high-frequency component being composed of three modulated waves at a single carrier frequency with a mutual phase separation of 120 electrical degrees, and reference components derived from said superposed light pattern, each of said primary color images being focused on said plane by said optical means in a pattern of stripes so that at least one of said color stripes overlaps spatially with at least one other of said stripes, the area which is exclusively said one primary color being substantially narrower than the resolution capability of said electron beam means, means for generating from said reference components a reference signal which tracks the scan velocity of said electron beam, demodulation means for combining said reference signal with said high-frequency signal to separate said high-frequency component into three individual signals according to the phase differences among said individual signals, and means for algebraically combining each separated signal with said low-frequency component to produce three independent modulated outputs containing the color information of said subject.

2. A color television camera as claimed in claim 1 wherein said optical means includes three primary dichroic mirrors positioned to split a subject image beam into three primary color images and a lenticular lens plate for focusing each of said primary color images on said plane in a pattern of primary color strip sets, said lenticular lens plate being positioned so that the image of said transparency is superimposed upon said plane with said three primary images.

3. A color television camera as claimed in claim 2 wherein said reference components produced by said scanning means consists of a component proportional to the frequency of said transparency and a component proportional to the frequency of the difference between the frequency of said lenticular lens and said transparency, and wherein said reference signal generating means includes means for separately passing said difference frequency component and said transparency frequency component and means for mixing said difference and said transparency frequency components to produce a sum frequency which is said reference signal.

* * * * *